March 20, 1928.

A. BORN 1,663,331

EXTRUSION PRESS

Filed June 24, 1926

Patented Mar. 20, 1928.

1,663,331

UNITED STATES PATENT OFFICE.

ALFRED BORN, OF MAGDEBURG, GERMANY, ASSIGNOR TO THE FIRM FRIED. KRUPP GRUSONWERK AKTIENGESELLSCHAFT, OF MAGDEBURG-BUCKAU, GERMANY.

EXTRUSION PRESS.

Application filed June 24, 1926, Serial No. 118,381, and in Germany June 24, 1925.

This invention relates to extrusion presses for the manufacture of articles of any desired length and of any desired cross section from blocks of material such as heated metal blocks. Extrusion presses are known in which the press die is stationary, and the holder is moved during the compression, and it has also been proposed to utilize the adjustability of the holder in such a manner that the holder can be pushed over the press die before each pressing operation in order to produce space for the introduction of the block. The holder is then pushed over the block, whereupon the compression is effected by moving the holder towards the press die or conversely, and the pressed article is extruded through the hollow die. In presses of this kind, the matrix is located, in any position of the holder, in its bore, and is therefore difficult of access.

The present invention has for its object to eliminate this disadvantage, and for this purpose according to the invention the holder is made movable in both directions to an extent such that the matrix, which is mounted on the head of the hollow die, is freely exposed in both end positions of the holder. This ensures easy accessibility of the matrix and therefore facilitates its replacement.

In order that the said invention may be clearly understood and readily carried into effect, the same will now be described more fully with reference to the accompanying drawings, in which:—

Figure 1:
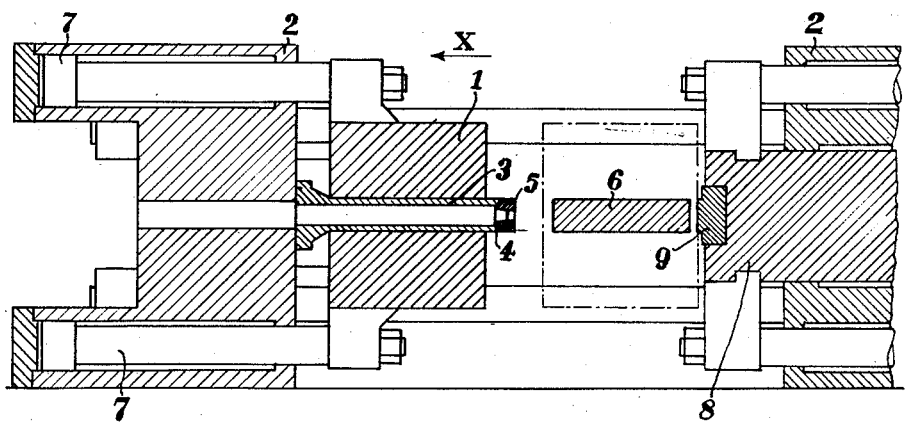
Figure 2:
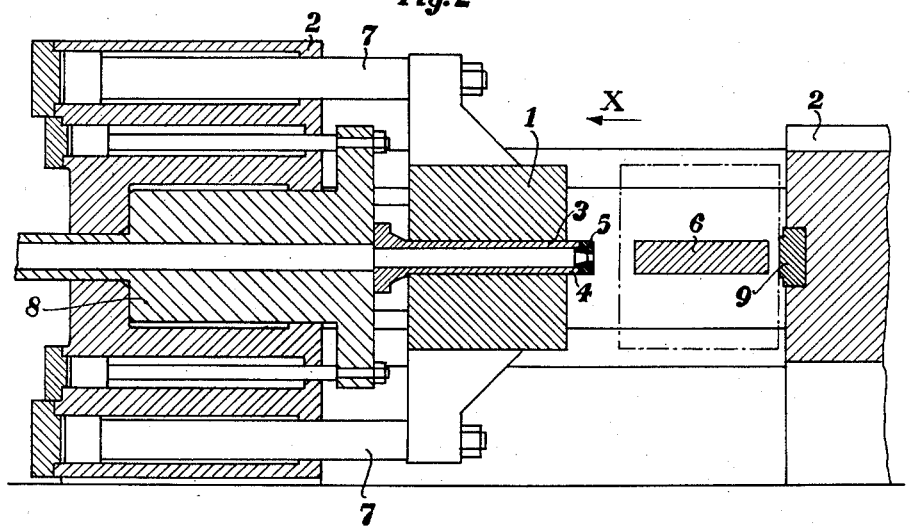

Figures 1 and 2 illustrate by way of example in axial section two constructions of a press according to the invention.

Referring to Figure 1, the holder 1 is made adjustable in the press frame 2, and the hollow press die 3 is fixed. On the head 4 of the die 3 is mounted the matrix 5. When the metal block 6 is to be introduced into the press, the holder 1 is withdrawn by means of the pistons 7 in the direction of the arrow x, over the press die into the position shown in full lines in Figure 1. The length of the free die shank is greater than the length of the holder, so that the holder can be moved on the die 3 to an extent such that its head 4 carrying the matrix 5, will project from the holder opening. After the block 6 has been brought into the position shown in Figure 1, the holder 1 is pushed by the pistons 7 over the die head 4 and matrix 5 and then over the block, until it engages with the end face of the press plunger 8 or of the block abutment 9 secured to the same. The press plunger 8 is shown in the position which it occupies before the beginning of the compression. The distance between the head 4 of the stationary press die 3 and the opposite end face of the press plunger 8 in the withdrawn position of the latter shown in Figure 1 is greater than the length of the holder, so that the matrix 5 is again exposed when the holder is in the other end position shown in chain dotted lines in Figure 1. The pressing is effected by advancing the plunger 8 in the direction x, whereby the holder is moved in the same direction, and the block is pressed against the matrix 5. The article is extruded in the desired shape through the matrix and the hollow press die.

In the construction illustrated in Figure 2 the holder 1 is pushed, before the introduction of the block, in the direction x over the press die 3, whereafter it is pushed back over the block. During the compression, the holder remains stationary and the die 3 is then pressed by means of the press plunger 8 into the holder 1. The block 6 engages with the block abutment 9 secured to the frame of the press, and the pressed article is extruded through the matrix 5 and the hollow press die. In this arrangement also the matrix is exposed in the two end positions of the holder, this characteristic being an essential condition. Apart from this, the construction and the working of the press may be varied.

What I claim is:—

An extrusion press for the manufacture of rod shaped or tubular bodies comprising a hollow ram, a matrix mounted on said ram, a counter-pressure abutment opposite said ram, said ram and abutment being relatively movable, a billet holder adapted to slip over said ram, said holder being shorter than said ram and shorter than the distance between the head of said ram and said abutment in their most remote relative positions, and means for reciprocating said holder, the stroke of said reciprocating means being of such length that said matrix is exposed in either end position of the holder.

The foregoing specification signed at Berlin, Germany, this 4th day of June, 1926.

ALFRED BORN.